US012713338B2

(12) United States Patent
Caban Babilonia

(10) Patent No.: US 12,713,338 B2
(45) Date of Patent: Aug. 18, 2026

(54) NETWORK PATH SELECTION BASED ON POWER CONSUMPTION

(71) Applicant: Red Hat, Inc., Raleigh, NC (US)

(72) Inventor: William J. Caban Babilonia, Annapolis, MD (US)

(73) Assignee: Red Hat, Inc., Raleigh, NC (US)

( * ) Notice: Subject to any disclaimer, the term of this patent is extended or adjusted under 35 U.S.C. 154(b) by 551 days.

(21) Appl. No.: 18/145,616

(22) Filed: Dec. 22, 2022

(65) Prior Publication Data

US 2024/0214921 A1 Jun. 27, 2024

(51) Int. Cl.
*H04W 52/02* (2009.01)
*H04W 40/02* (2009.01)

(52) U.S. Cl.
CPC ....... *H04W 52/0203* (2013.01); *H04W 40/02* (2013.01)

(58) Field of Classification Search
None
See application file for complete search history.

(56) References Cited

U.S. PATENT DOCUMENTS 8,392,737 B2 3/2013 Sharma et al.
9,819,583 B2 11/2017 Dharmadhikari et al.
2010/0061264 A1* 3/2010 Campbell ............. H04L 45/124 370/253
2011/0055611 A1* 3/2011 Sharma ................... H04L 45/00 713/324
2013/0031244 A1* 1/2013 Zhang ..................... H04L 45/42 709/224
2014/0173232 A1* 6/2014 Reohr ................... G06F 3/0611 711/162
2017/0064717 A1* 3/2017 Filsfils .................... H04L 45/50
2018/0049096 A1 2/2018 Logvinov et al.
2019/0379605 A1* 12/2019 Pfister .................. G06N 3/0455
2020/0272923 A1* 8/2020 Banerjee ............... H04L 41/142
2023/0110131 A1* 4/2023 Smith ..................... H04L 69/22 370/254

FOREIGN PATENT DOCUMENTS

CN 105721302 B 3/2019

* cited by examiner

*Primary Examiner* — Wutchung Chu
*Assistant Examiner* — Berhanu D Belete
(74) *Attorney, Agent, or Firm* — Kilpatrick Townsend & Stockton LLP

(57) ABSTRACT

Network paths can be selected based on power consumption according to some aspects of the present disclosure. In one example, a system can receive a routing request from user equipment. The system can determine a network paths of a wireless network, where each network path is a route between the user equipment and a service application associated with the routing request. The system can determine a power consumption associated with each network and select a network path for the routing request based on the power consumption associated with each network path. The system can enable the network path between the user equipment and the service application for the routing request.

15 Claims, 7 Drawing Sheets

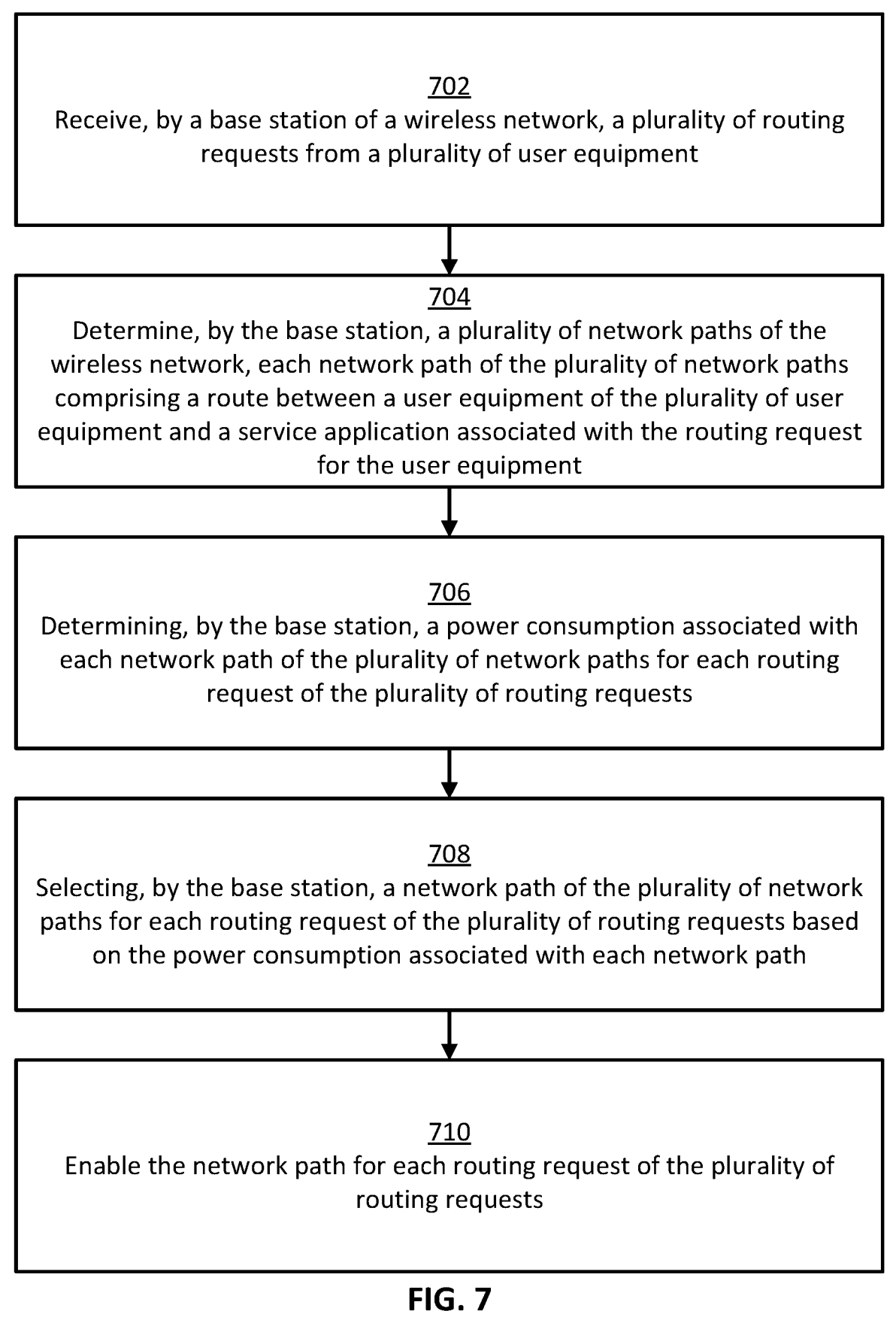

702
Receive, by a base station of a wireless network, a plurality of routing requests from a plurality of user equipment 704
Determine, by the base station, a plurality of network paths of the wireless network, each network path of the plurality of network paths comprising a route between a user equipment of the plurality of user equipment and a service application associated with the routing request for the user equipment 706
Determining, by the base station, a power consumption associated with each network path of the plurality of network paths for each routing request of the plurality of routing requests 708
Selecting, by the base station, a network path of the plurality of network paths for each routing request of the plurality of routing requests based on the power consumption associated with each network path 710
Enable the network path for each routing request of the plurality of routing requests

FIG. 7

NETWORK PATH SELECTION BASED ON POWER CONSUMPTION

TECHNICAL FIELD

The present disclosure relates generally to wireless networks. More specifically, but not by way of limitation, this disclosure relates to network path selection based on power consumption.

BACKGROUND

Distributed computing environments can include multiple computing clusters that can perform various functions. One common type of distributed computing environment can be a telecommunications system, such as a cellular network for facilitating voice and data communications via mobile devices. User equipment can connect to service applications configured to support voice and data services via network devices. For example, a telecommunication system can include computing devices running software components that support video conferencing, web surfing, voice communications, and other workloads.

BRIEF DESCRIPTION OF THE DRAWINGS

FIG. 7 shows a flow chart of an example of a process for selecting network paths for routing requests according to some aspects of the present disclosure.

DETAILED DESCRIPTION

Figure 1:
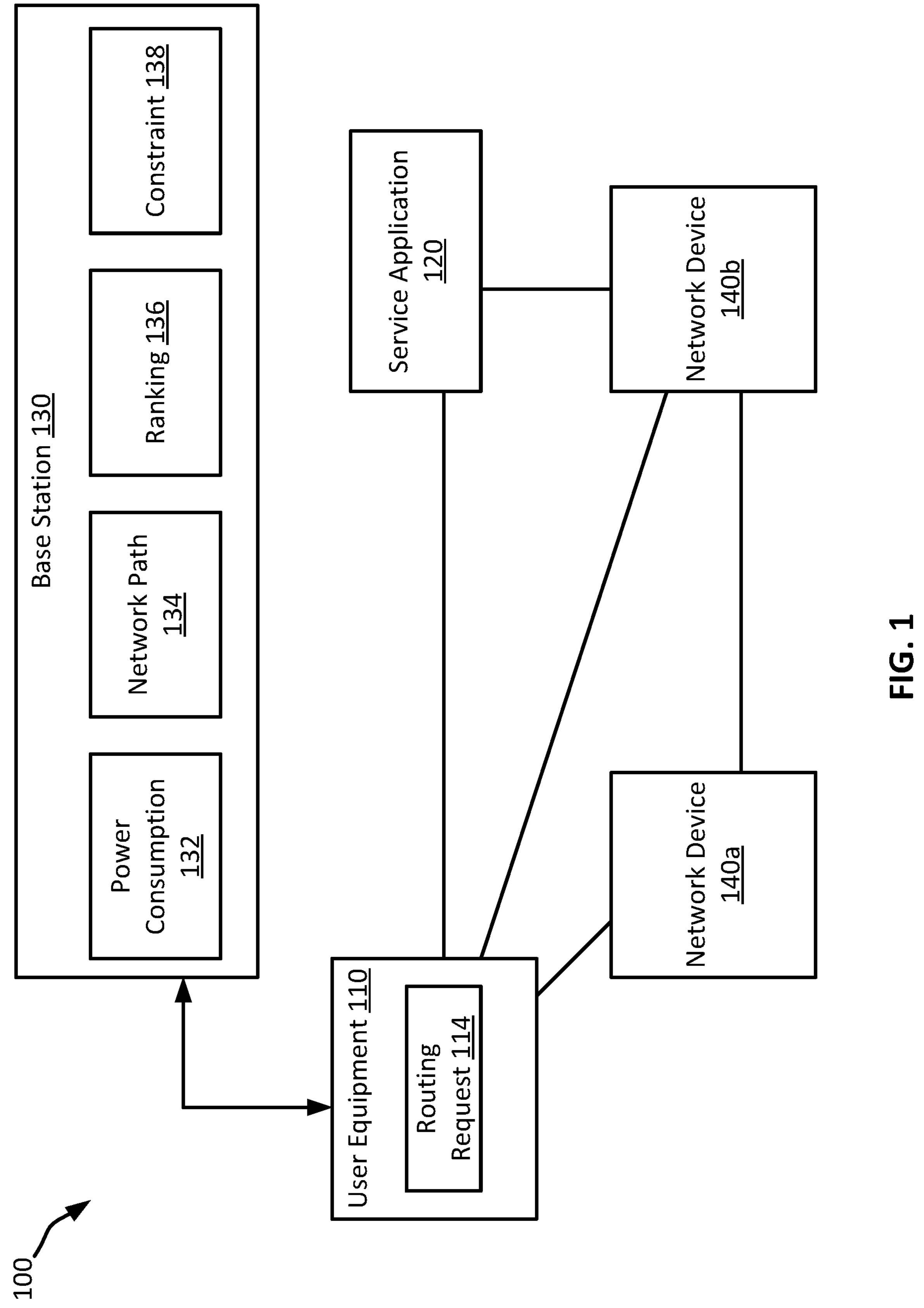
FIG. 1 shows a block diagram of an example of a system for implementing network path selection based on power consumption according to some aspects of the present disclosure.

In a wireless telecommunication network, user equipment request access to various service applications. A base station can determine a network path for connecting the user equipment to the service application. In conventional systems, the base station may select a network path that is the shortest total distance between the user equipment and the service application. Or, the base station may select the network path that includes the fewest number of hops between the user equipment and the service application. A hop can refer to the number of segments between the user equipment, network devices, and the service application. For instance, a direct network path between the user equipment and the service application may be one hop, a network path involving one network device between the user equipment and the service application may be two hops, etc. In any case, selecting the network path based on the distance or number of hops may be suboptimal. Some segments of the network may be associated with significant power consumption. So, if the segment is part of the shortest network path, then selecting that network path may increase the power consumption of the wireless network, which may lead to additional adverse effects for the wireless network.

Some examples of the present disclosure can overcome one or more of the abovementioned problems by providing a system that selects network paths based on power consumption, and optionally additional parameters. The system can include user equipment that can connect with a service application via a wireless network. The system can also include network devices of the wireless network that form network paths between the user equipment and the service application. The system can receive a routing request from the user equipment indicating a request to connect with the service application. The system can determine a power consumption associated with each network path and select a network path for the routing request based on the power consumption. The system can then enable the network path between the user equipment and the service application. The selected network path can be the network path associated with a lowest power consumption, thus the power consumption for the wireless network can be reduced.

As one example, a mobile phone may send a routing request to a base station requesting access to a content streaming application. The base station can determine a first network path directly connecting the mobile phone and the content streaming application is associated with a power consumption of 8 W and a second network path that indirectly connects the mobile phone and the content streaming application through a router is associated with a power consumption of 3 W. So, the base station can select and enable the second network path for the routing request to minimize the power consumption of the connection between the mobile phone and the content streaming application.

As another example, a first mobile phone may send a routing request to a base station requesting access to a content streaming application and a second mobile phone may send a routing request to the base station requesting access to a maps application. The base station can determine network paths between the first mobile phone and the content streaming application and network paths between the second mobile phone and the maps application. The base station can also determine a power consumption associated with each network path and then input the network paths and the associated power consumptions into a machine-learning model trained to select network paths for user equipment-to-service application connections. The output of the machine-learning model is an indication of a first network path between the first mobile phone and the content streaming application and a second network path between the second mobile phone and the maps application. The output can distribute power consumption across the wireless network. So, even if a particular network path is associated with a lowest power consumption, the output may indicate a different network path based on the network path selected for the other routing request. So, the base station can distribute power consumption based on all routing requests associated with the wireless network.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a block diagram of an example of a system 100 for implementing network path selection based on power consumption according to some aspects of the present disclosure. The system 100 can be operated by a telecommunication carrier, such as AT&T® or Verizon®, and house the physical infrastructure for routing telephone calls and data communications between devices. For example, the system 100 can include a public switched telephone network ("PSTN") and may have one or more base stations, switches, local exchanges, and core networks for connecting telephone calls between callers and recipients.

The system 100 can be a wireless network (e.g., a fourth-generation (4G) long-term evolution (LTE) network, a fifth-generation (5G) network, WiFi-6, or another mobile network communication technology) that includes user equipment 110, a service application 120, a base station 130, and network devices 140*a-b*. The service application 120 can be a software application that provides a service (e.g., media or other content) to the user equipment 110 upon request. The network devices 140*a-b* can be switches, routers, antennae, bridges, or any other suitable network device. The user equipment 110 can be a mobile phone, a laptop, a desktop computer, and the like. Although only the user equipment 110 is illustrated as being in communication with the base station 130, each of the network devices 140*a-b* may additionally be in communication with the base station 130.

The base station 130 can receive a routing request 114 from the user equipment 110. The routing request 114 can indicate that the user equipment 110 is requesting to connect to the service application 120. For instance, the routing request 114 may indicate that the user equipment 110 is attempting to access a video stream, which is the service application 120. Upon receiving the routing request 114, the base station 130 can determine network paths between the user equipment 110 and the service application 120. The network paths can include a direct path between the user equipment 110 and the service application 120 and one or more indirect paths that include one or more of the network devices 140*a-b*. For example, a first indirect path may originate at the user equipment 110, go through the network device 140*a*, through the network device 140*b*, and then end at the service application 120. Alternatively, a second indirect path may originate at the user equipment 110, go through the network device 140*b*, and then end at the service application 120.

Rather than selecting the network path that is shortest in distance or includes the fewest number of hops between the user equipment 110 and the service application 120, the base station 130 can account for a power consumption 132 associated with each network path in selecting a network path 134 between the user equipment 110 and the service application 120. To account for the power consumption 132, the base station 130 can determine the power consumption 132 associated with each network path. The power consumption 132 for each network path can be a sum of the power consumption of the individual power consumption of segments (e.g., links between two devices) of the network path and a fraction of the power consumption of the device (e.g., switch or router total consumption not directly assigned to a port, in addition to the individual port consumption).

In some examples, the base station 130 can then select the network path 134 for the routing request 114 based on the power consumption 132. For instance, the base station 130 may generate a ranking 136 of the network paths based on the power consumption 132 of each network path. Network paths with higher power consumptions may be ranked lower than network paths with lower power consumptions. That is, a network path with 10 W of power consumption can be ranked higher than a network path with 15 W of power consumption. From the ranking 136, the base station 130 can determine which network path has a lowest power consumption and select that network path as the network path 134 for the routing request 114.

Prior to selecting the network path 134, the base station 130 may identify a constraint 138 of the service application 120. The constraint 138 may be a bandwidth constraint, a latency constraint, a packet loss constraint, a regulatory constraint, etc. An example of a regulatory constraint may be that traffic is constrained to use encrypted landline communications. In a particular example, if the service application 120 is a gaming application, the constraint 138 may be a latency constraint of three milliseconds, meaning that the service application 120 requires the network path to the user equipment 110 to be less than three milliseconds. Upon identifying the constraint 138, the base station 130 can determine a subset of the network paths between the user equipment 110 and the service application 120 that satisfy the constraint 138. For instance, if the constraint 138 is a latency constraint of three milliseconds, the base station 130 can determine which network paths have a latency that is greater than three milliseconds and remove the network paths that have a latency that is greater than three milliseconds from the subset. The base station 130 can then select the network path 134 from the subset of the network paths. In some examples, the network path that is associated with the lowest power consumption may not be included in the subset of the network paths, so the base station 130 can select the network path 134 as the network path with the lowest power consumption in the subset.

Once the base station 130 selects the network path 134, the base station 130 can enable the network path 134. For instance, the base station 130 may use traffic engineering techniques or other techniques to configure the network path 134 between the user equipment 110 and the service application 120. Upon the base station 130 enabling the network path 134, the user equipment 110 can connect to the service application 120 via the network path 134.

In some examples, as further described herein below, multiple user equipment may request connections to one or more service applications. The base station 130 can receive the requests from each user equipment, determine network paths for each user equipment-to-service application pair, determine the power consumption for each network path, and select a network path for each user equipment-to-service application pair based on the power consumption. For instance, the base station 130 may select network paths that distributes the power consumption throughout the system 100, that minimizes the total power consumption of the system 100, or based on some other criteria. In some instances, the base station 130 may use a machine-learning model to select the network path for each user equipment-to-service application pair.

Over time the power consumption associated with each network path may change based on the number of user equipment devices in the system 100, a usage of network paths, and other factors. So, the base station 130 may periodically reevaluate the power consumption 132 for the network path 134 and the other network paths between the user equipment 110 and the service application 120 to determine whether a different network path should be enabled. If the base station 130 determines that a different network path is associated with a lower power consumption than the network path 134, the base station 130 can determine that the different network path should be enabled between the user equipment 110 and the service application 120.

The frequency at which the base station 130 reevaluates the power consumption can be based on a type of connection between the devices of a segment. For example, if network device 140*a* is connected to network device 140*b* over a fiber connection or a 5G connection, the power consumption for the segment connecting the network device 140*a* and the network device 140*b* may be reevaluated every few milliseconds (e.g., every five milliseconds). But, if the user equipment 110 is connected to the network device 140*a* using Ethernet, the power consumption for the segment connecting the user equipment 110 to the network device 140*a* may be reevaluated every few minutes (e.g., every five minutes).

Although a certain number and arrangement of components in shown in FIG. 1, this is intended to be illustrative and non-limiting. Other examples may include more components, fewer components, different components, or a different arrangement of the components shown in FIG. 1. For instance, similar principles can be applied outside of the telecommunication context to other types of distributed computing environments. It will further be appreciated that although FIG. 1 depicts the two network devices, in other examples there may be fewer or more network devices.

Figure 2:
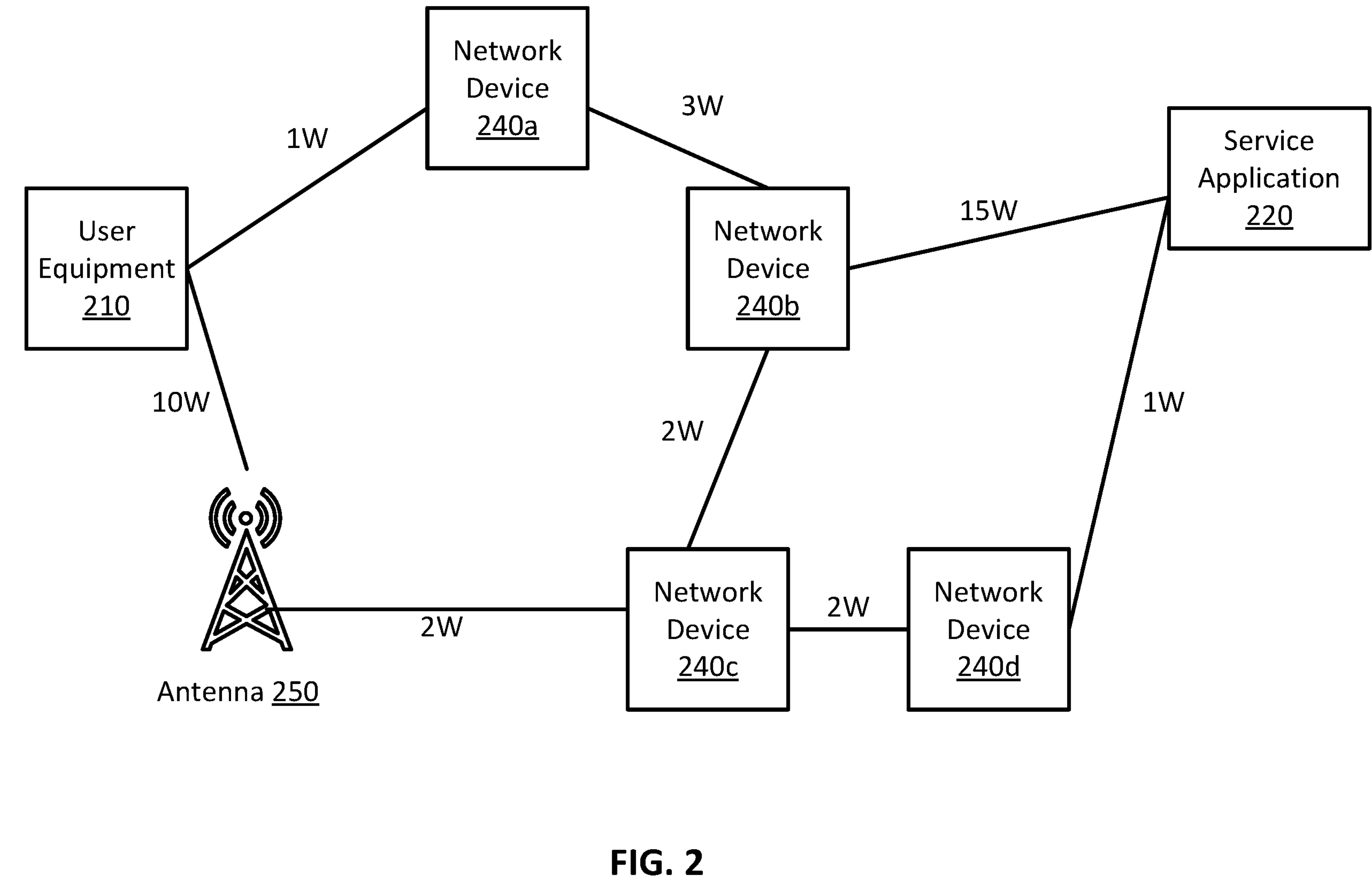
FIG. 2 shows a block diagram of network devices forming network paths according to some aspects of the present disclosure.

FIG. 2 shows a block diagram of network devices forming network paths according to some aspects of the present disclosure. In an example, user equipment 210 can be attempting to connect to service application 220. A base station (e.g., base station 130 in FIG. 1) may receive a routing request from the user equipment 210 to connect to the service application 220. Various network paths are available for connecting the user equipment 210 to the service application 220, and each network path is associated with a particular amount of power consumption. For instance, a first network path can involve the user equipment 210, network device 240*a*, network device 240*b*, and the service application 220. A second network path can involve the user equipment 210, network device 240*a*, network device 240*b*, network device 240*c*, network device 240*d*, and the service application 220. A third network path can involve the user equipment 210, antenna 250, network device 240*c*, network device 240*d*, and the service application 220. A fourth network path can involve the user equipment 210, antenna 250, network device 240*c*, network device 240*b*, and the service application 220.

In some examples, the base station can then select a network path based on the power consumption associated with each network path. For example, the first network path may consume 19 W of power, the second network path may consume 9 W of power, the third network path may consume 15 W of power, and the fourth network path may consume 29 W of power. The base station can select the second network path to connect the user equipment 210 to the service application 220, since the second network path is associated with the lowest power consumption. That is, even though the second network path is associated with the largest number of hops, the second network path can be selected based on the power consumption.

Figure 3:
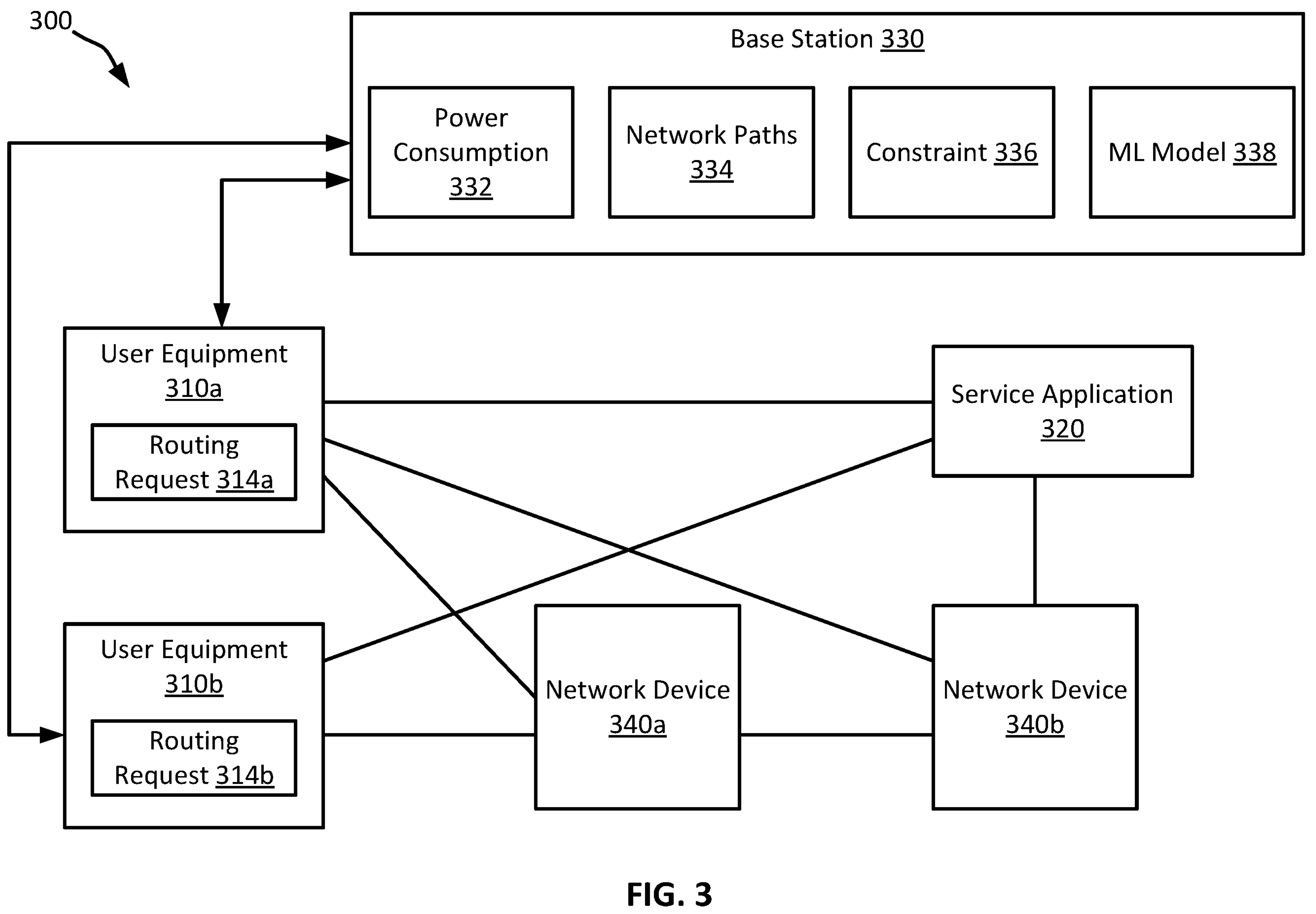
FIG. 3 shows a block diagram of an example of another system for implementing network path selection based on power consumption according to some aspects of the present disclosure.

FIG. 3 shows a block diagram of an example of another system 300 for implementing network path selection based on power consumption according to some aspects of the present disclosure. Similar to FIG. 1, the system 300 can be operated by a telecommunication carrier, such as AT&T® or Verizon®, and house the physical infrastructure for routing telephone calls and data communications between devices. For example, the system 300 can include a public switched telephone network ("PSTN") and may have one or more base stations, switches, local exchanges, and core networks for connecting telephone calls between callers and recipients.

The system 300 can be a wireless network (e.g., a 4G LTE network, a 5G network, a WiFi-6 network, etc.) that includes user equipment 310*a-b*, a service application 320, a base station 330, and network devices 340*a-b*. The service application 320 can be a software application that provides a service (e.g., media or other content) to the user equipment 310*a-b* upon request. The network devices 340*a-b* can be switches, routers, antennae, bridges, or any other suitable network device. The user equipment 310*a-b* can be mobile phones, laptops, desktop computers, and the like. Although only the user equipment 310*a-b* are illustrated as being in communication with the base station 330, each of the network devices 340*a-b* may additionally be in communication with the base station 330.

The base station 330 can receive routing requests 314*a-b* from the user equipment 310*a-b*. That is, the base station 330 can receive routing request 314*a* from user equipment 310*a* and routing request 314*b* from user equipment 310*b*. The routing requests 314*a-b* can indicate that the user equipment 310*a-b* are each requesting to connect to the service application 320. In other examples, the routing requests 314*a-b* may indicate that the user equipment 310*a-b* are requesting to connect to different service applications.

Upon receiving the routing requests 314*a-b*, the base station 330 can determine network paths between the user equipment 310*a-b* and the service application 320. The network paths may include direct paths between the user equipment 310*a-b* and the service application 320 and one or more indirect paths that include one or more of the network devices 340*a-b*. The base station 330 can account for a power consumption 332 associated with each network path in selecting network paths 334 between the user equipment 310*a-b* and the service application 320. To account for the power consumption 332, the base station 330 can determine the power consumption 332 associated with each network path. The power consumption 332 for each network path can be a sum of the power consumption of the individual power consumption of segments (e.g., links between two devices) of the network path and a fraction of the power consumption of the device (e.g., switch or router total consumption not directly assigned to a port, in addition to the individual port consumption).

Prior to selecting the network paths 334, the base station 330 may identify a constraint 336 of the service application 320. The constraint 336 may be a bandwidth constraint, a latency constraint, a packet loss constraint, a regulatory constraint, etc. For example, if the service application 320 is a gaming application, the constraint 336 may be a latency constraint of five milliseconds, meaning that the service application 320 requires the network paths to the user equipment 310*a-b* to each be less than five milliseconds. Upon identifying the constraint 336, the base station 330 can determine a subset of the network paths between the user equipment 310*a-b* and the service application 320 that satisfy the constraint 336. For instance, if the constraint 336 is a latency constraint of five milliseconds, the base station 330 can determine which network paths have a latency that is greater than five milliseconds and remove the network paths that have a latency that is greater than five milliseconds from the subset. The base station 330 can then select the network paths 334 from the subset of the network paths. In some examples, the network paths that are associated with the lowest power consumption may not be included in the subset of the network paths, so the base station 330 can select the network paths 334 as the network path with the lowest power consumption in the subset.

In some examples, the base station 330 may use a machine-learning model 338 to select the network path for each user equipment-to-service application pair. The base station 330 can provide an input to the machine-learning model 338, which can be trained to select network paths for user equipment-to-service application connections. The machine-learning model 338 can be trained using training data that includes a set of historical routing requests, network paths for each historical routing request, and the power consumption associated with each network path. The training data can additionally include labels indicating a selected network path and the machine-learning model 338 can be trained to minimize a loss function based on the labels. As an example, the machine-learning model 338 may be an extreme gradient boosting (XGBoost) model, an ensemble model, or any other suitable machine-learning model.

Once trained, the base station 330 can input the network paths for the routing requests 314*a-b* and the power consumption associated with each network path into the machine-learning model 338 and receive an output indicating the network paths 334 for the routing requests 314*a-b*. The selected network paths 334 can distribute power consumption across the wireless network.

Once the base station 330 selects the network paths 334, the base station 330 can enable the network paths 334. For instance, the base station 330 may use traffic engineering techniques or other techniques to configure the network paths 334 between the user equipment 310*a-b* and the service application 320. Upon the base station 330 enabling the network paths 334, the user equipment 310*a-b* can connect to the service application 320 via the network paths 334.

Although a certain number and arrangement of components in shown in FIG. 3, this is intended to be illustrative and non-limiting. Other examples may include more components, fewer components, different components, or a different arrangement of the components shown in FIG. 3. For instance, similar principles can be applied outside of the telecommunication context to other types of distributed computing environments. It will further be appreciated that although FIG. 3 depicts the two network devices, two user equipments, and one service application, in other examples there may be fewer or more of each of these components.

Figure 4:
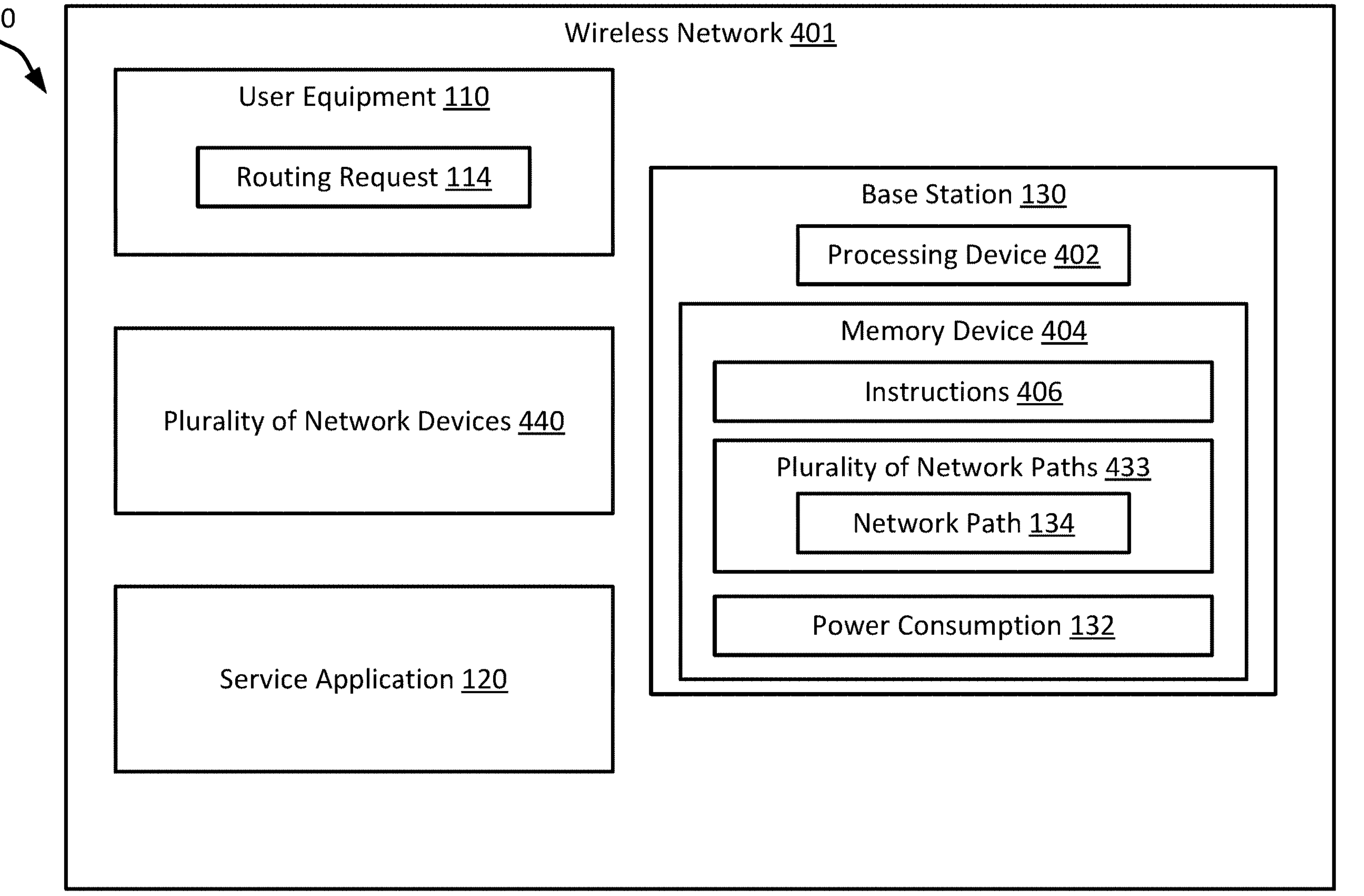
FIG. 4 shows a block diagram of an example of a system for selecting a network path for a routing request according to some aspects of the present disclosure.

FIG. 4 shows a block diagram of an example of a system 400 for selecting a network path for a routing request according to some aspects of the present disclosure. The system 400 includes a processing device 402 communicatively coupled to a memory device 404. In some examples, the processing device 402 and the memory device 404 can be part of the same computing device. In other examples, the processing device 402 and the memory device 404 can be distributed from (e.g., remote to) one another. The processing device 402 and the memory device 404 may be part of a base station 130 of a wireless network 401.

The processing device 402 can include one processor or multiple processors. Non-limiting examples of the processing device 402 include a Field-Programmable Gate Array (FPGA), an application-specific integrated circuit (ASIC), a microprocessor, etc. The processing device 402 can execute instructions 406 stored in the memory device 404 to perform operations. The instructions 406 may include processor-specific instructions generated by a compiler or an interpreter from code written in any suitable computer-programming language, such as C, C++, C#, etc.

The memory device 404 can include one memory or multiple memories. The memory device 404 can be non-volatile and may include any type of memory that retains stored information when powered off. Non-limiting examples of the memory device 404 include electrically erasable and programmable read-only memory (EEPROM), flash memory, or any other type of non-volatile memory. At least some of the memory device 404 can include a non-transitory computer-readable medium from which the processing device 402 can read instructions 406. A computer-readable medium can include electronic, optical, magnetic, or other storage devices capable of providing the processing device 402 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 406.

The processing device 402 can execute the instructions 406 to perform operations. For example, the processing device 402 can receive a routing request 114 from user equipment 110 and determine a plurality of network paths 433 of the wireless network 401. Each network path of the plurality of network paths 433 includes a route between the user equipment 110 and a service application 120 associated with the routing request 114. The plurality of network paths 433 can be formed from a plurality of network devices 440. The processing device 402 can determine a power consumption 132 associated with each network path of the plurality of network paths 433 and select a network path 134 of the plurality of network paths 433 based on the power consumption 132 associated with each network path. The processing device 402 can enable the network path 134 between the user equipment 110 and the service application 120 for the routing request 114.

Figure 5:
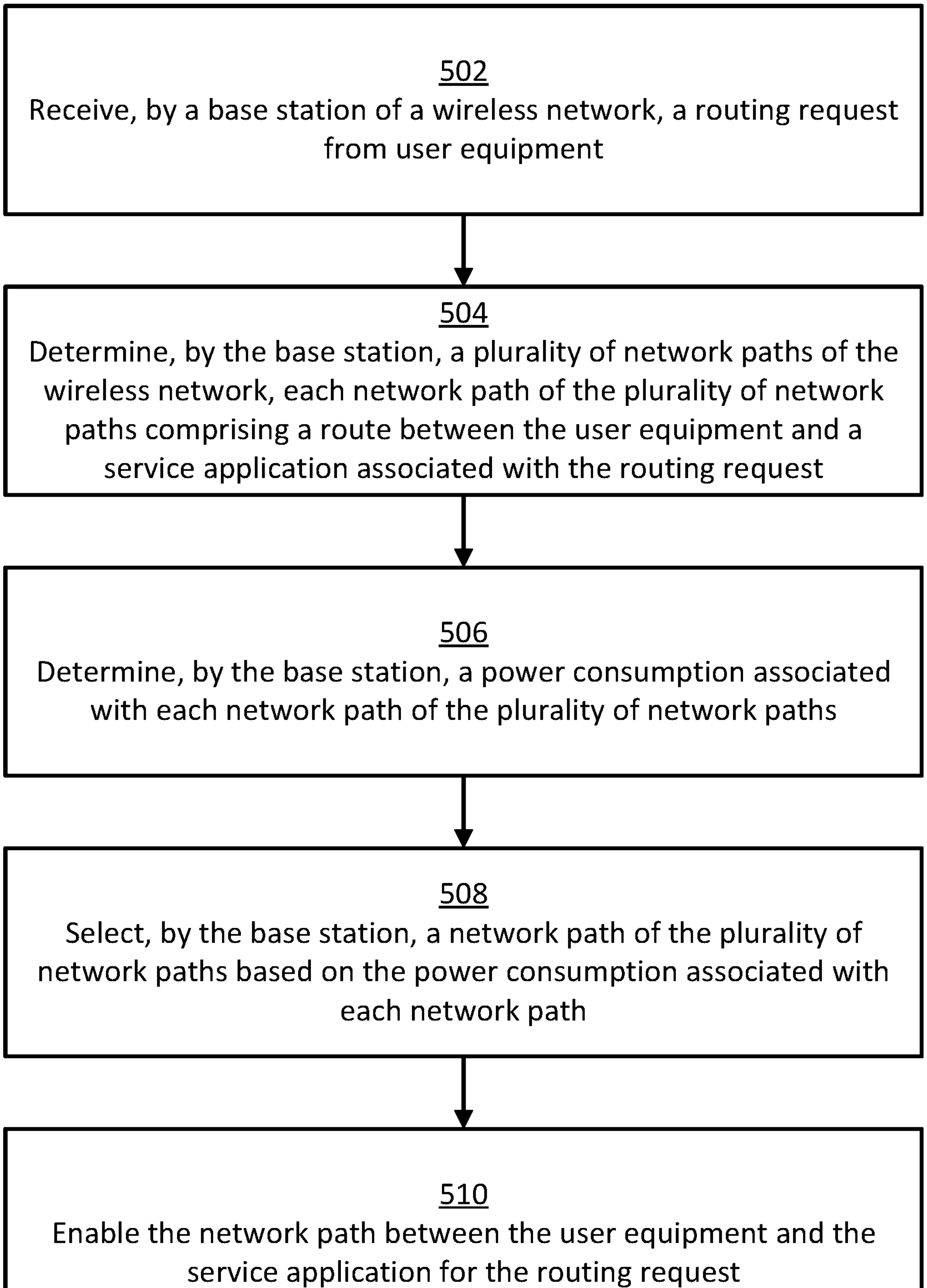
FIG. 5 shows a flow chart of an example of a process for selecting a network path for a routing request according to some aspects of the present disclosure.

In some examples, the processing device 402 can implement the process shown in FIG. 5. Other examples can include more steps, fewer steps, different steps, or a different order of the steps than is shown in FIG. 5. The steps of FIG. 5 are discussed below with reference to the components discussed above in relation to FIG. 4.

At block 502, the processing device 402 receives, by the base station 130 of the wireless network 401, a routing request 114 from user equipment 110. The routing request 114 can indicate that the user equipment 110 is requesting to connect to the service application 120. As an example, the routing request 114 may indicate that the user equipment 110 is attempting to access a web application, which is the service application 120.

At block 504, the processing device 402 determines, by the base station 130, a plurality of network paths 433 of the wireless network 401. Each network path of the plurality of network paths 433 includes a route between the user equipment 110 and a service application 120 associated with the routing request 114. The plurality of network paths 433 can include a direct path between the user equipment 110 and the service application 120 and one or more indirect paths that include one or more of the plurality of network devices 440.

At block 506, the processing device 402 determines, by the base station 130, a power consumption 132 associated with each network path of the plurality of network paths 433. The base station 130 may query another entity, such as a specialized element management application, for the power consumption metrics. The other entity can perform calculations to determine the power consumption 132 and then send the power consumption 132 to the base station 130. The power consumption 132 for each network path can be a sum of the power consumption of the individual power consumption of segments (e.g., links between two devices) of the network path and a fraction of the power consumption of the device (e.g., switch or router total consumption not directly assigned to a port, in addition to the individual port consumption).

At block 508, the processing device 402 selects, by the base station 130, a network path 134 of the plurality of network paths 433 based on the power consumption 132 associated with each network path. The processing device 402 may generate a ranking of the plurality of network paths 433 based on the power consumption 132 of each network path. Network paths with higher power consumptions may be ranked lower than network paths with lower power consumptions. From the ranking, the processing device 402 can determine which network path has a lowest power consumption and select that network path as the network path 134 for the routing request 114. The processing device 402 may also identify a bandwidth constraint, a latency constraint, a packet loss constraint, a regulatory constraint, etc. for the service application 120 and select the network path 134 based on the constraint.

At block 510, the processing device 402 enables the network path 134 between the user equipment 110 and the service application 120 for the routing request 114. The processing device 402 may use traffic engineering techniques or other techniques to configure the network path 134 between the user equipment 110 and the service application 120. Upon the network path 134 being enabled, the user equipment 110 can connect to the service application 120 via the network path 134.

Figure 6:
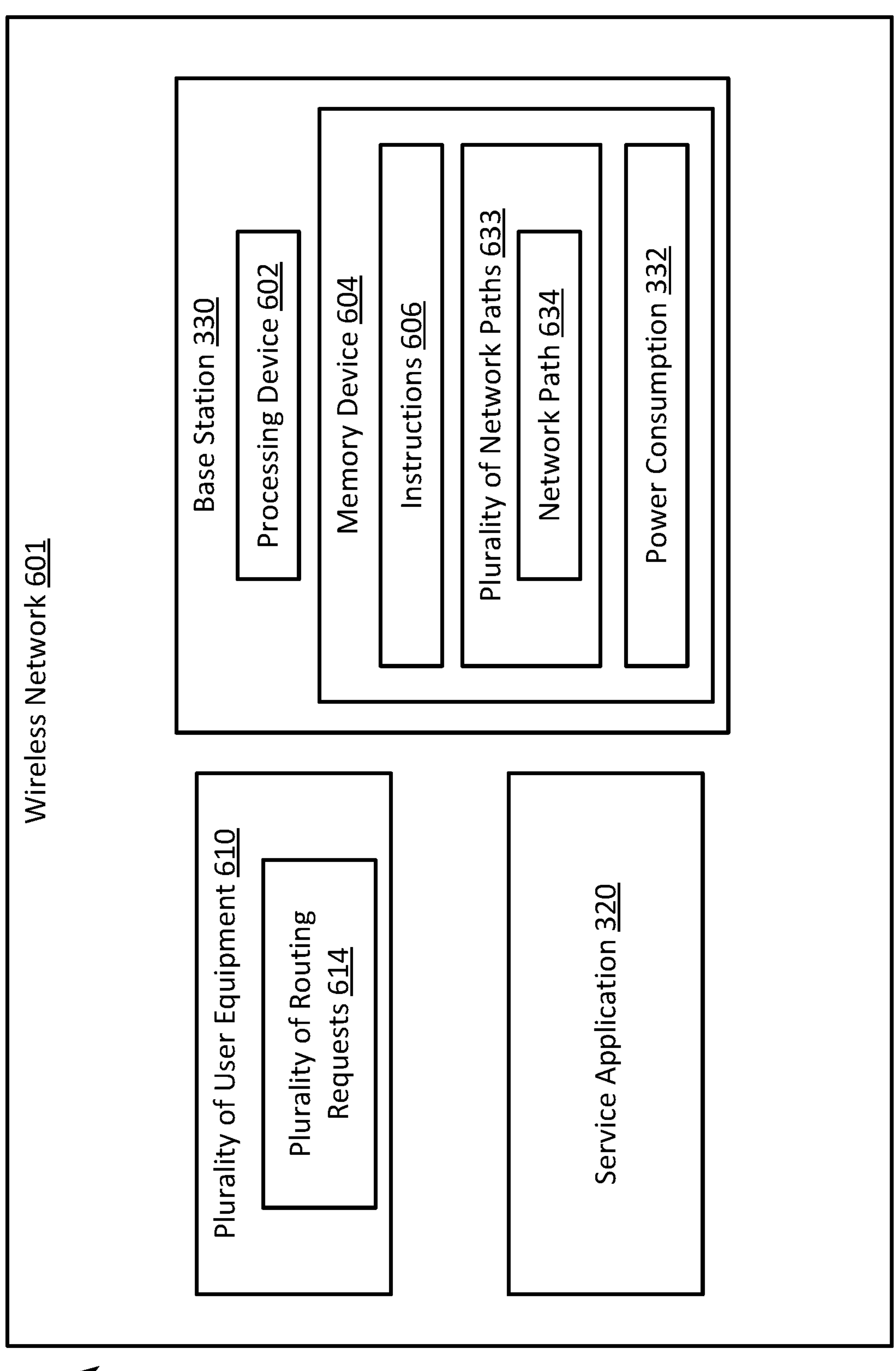
FIG. 6 shows a block diagram of an example of a system for selecting network paths for routing requests according to some aspects of the present disclosure.

FIG. 6 shows a block diagram of an example of a system 600 for selecting network paths for routing requests according to some aspects of the present disclosure. The system 600 includes a processing device 602 communicatively coupled to a memory device 604. In some examples, the processing device 602 and the memory device 604 can be part of the same computing device. In other examples, the processing device 602 and the memory device 604 can be distributed from (e.g., remote to) one another. The processing device 602 and the memory device 604 may be part of a base station 330 of a wireless network 601.

The processing device 602 can include one processor or multiple processors. Non-limiting examples of the processing device 602 include a Field-Programmable Gate Array (FPGA), an application-specific integrated circuit (ASIC), a microprocessor, etc. The processing device 602 can execute instructions 606 stored in the memory device 404 to perform operations. The instructions 606 may include processor-specific instructions generated by a compiler or an interpreter from code written in any suitable computer-programming language, such as C, C++, C#, etc.

The memory device 604 can include one memory or multiple memories. The memory device 604 can be non-volatile and may include any type of memory that retains stored information when powered off. Non-limiting examples of the memory device 604 include electrically erasable and programmable read-only memory (EEPROM), flash memory, or any other type of non-volatile memory. At least some of the memory device 604 can include a non-transitory computer-readable medium from which the processing device 602 can read instructions 606. A computer-readable medium can include electronic, optical, magnetic, or other storage devices capable of providing the processing device 602 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 606.

The processing device 602 can execute the instructions 606 to perform operations. For example, the processing device 602 can receive a plurality of routing requests 614 from a plurality of user equipment 610. The processing device 602 can determine a plurality of network paths 633 of the wireless network 601 for each routing request of the plurality of routing requests 614. Each network path of the plurality of network paths 633 includes a route between a user equipment of the plurality of user equipment 610 and a service application 320 associated with the routing request for the user equipment. The processing device 602 can determine a power consumption 332 associated with each network path of the plurality of network paths 633 for each routing request of the plurality of routing requests 614. The processing device 602 can select a network path 634 of the plurality of network paths 633 for each routing request of the plurality of routing requests 614 based on the power consumption 332 associated with each network path. The processing device 602 can enable the network path 634 for each routing request of the plurality of routing requests 614.

In some examples, the processing device 602 can implement the process shown in FIG. 7. Other examples can include more steps, fewer steps, different steps, or a different order of the steps than is shown in FIG. 7. The steps of FIG. 7 are discussed below with reference to the components discussed above in relation to FIG. 6.

At block 702, the processing device 602 receives, by the base station 330 of the wireless network 601, a plurality of routing requests 614 from a plurality of user equipment 610. The routing requests 614 can indicate which user equipment is requesting to connect to which service applications. As an example, a routing request of the plurality of routing requests 614 may indicate that a user equipment is attempting to access a web application, which is the service application 320.

At block 704, the processing device 602 determines, by the base station 330, a plurality of network paths 633 of the wireless network 601. Each network path of the plurality of network paths 633 includes a route between the user equipment of the plurality of user equipment 610 and a service application 320 associated with the routing request for the user equipment. The plurality of network paths 633 can include a direct path between each user equipment and service application, and one or more indirect paths that include one or more network devices.

At block 706, the processing device 602 determines, by the base station 330, a power consumption 332 associated with each network path of the plurality of network paths 633. The power consumption 332 for each network path can be a sum of the power consumption of the individual power consumption of segments (e.g., links between two devices) of the network path and a fraction of the power consumption of the device (e.g., switch or router total consumption not directly assigned to a port, in addition to the individual port consumption).

At block 708, the processing device 602 selects, by the base station 330, a network path 634 of the plurality of network paths 633 for each routing request of the plurality of routing requests 614 based on the power consumption 332 associated with each network path. The processing device 602 may select each network path to distribute power consumption across the wireless network 601. In some examples, the processing device 602 can input the plurality of network paths 633 for each routing request and the power consumption 332 for each network path into a machine-learning model trained to select network paths for user equipment-to-service application pairs. The processing device 602 can then receive an output of the machine-learning model indicating the network path 634 for each routing request of the plurality of routing requests 614. The processing device 602 may also identify a bandwidth constraint, a latency constraint, a packet loss constraint, a regulatory constraint, etc. for the service application 320 for each routing request and select the network path 634 based on the constraint.

At block 710, the processing device 602 enables the network path 634 for each routing request of the plurality of routing requests 614. The processing device 602 may use traffic engineering techniques or other techniques to configure the network path 634 for each routing request. Upon the network path 634 being enabled, the plurality of user equipment 610 can connect to the service application 320 via the network path 634.

As used below, any reference to a series of examples is to be understood as a reference to each of those examples disjunctively (e.g., "Examples 1-4" is to be understood as "Examples 1, 2, 3, or 4").

Example 1 is a system comprising: user equipment configured to connect with a service application via a wireless network; a plurality of network devices of the wireless network configured to form a plurality of network paths between the user equipment and the service application; and a base station of the wireless network configured to: receive a routing request from the user equipment indicating a request to connect with the service application; determine a power consumption associated with each network path of the plurality of network paths; select a network path of the plurality of network paths based on the power consumption associated with each network path; and enable the network path between the user equipment and the service application.

Example 2 is the system of example 1, wherein the base station is further configured to: generate a ranking of the plurality of network paths based on the power consumption for each network path; determine that the network path is associated with a lowest power consumption; and select the network path in response to determining that the network path is associated with the lowest power consumption.

Example 3 is the system of example(s) 1-2, wherein the base station is further configured to: prior to selecting the network path, identify a constraint of the service application; determine a subset of network paths of the plurality of network paths that satisfy the constraint; and select the network path from the subset of network paths associated with a lowest power consumption.

Example 4 is the system of example 3, wherein the constraint comprises a latency constraint, a bandwidth constraint, a packet loss constraint, or a regulatory constraint.

Example 5 is the system of example(s) 1-4, wherein the base station is further configured to: receive a routing request from second user equipment; determine a second plurality of network paths of the wireless network, each network path of the second plurality of network paths comprising a route between the second user equipment and a second service application associated with the routing request; determine a second power consumption associated with each network path of the second plurality of network paths; and select the network path of the plurality of network paths and a second network path of the second plurality of network paths for the power consumption associated with the network path and the second power consumption associated with the second network path, wherein the network path and the second network path distribute power consumption across the wireless network.

Example 6 is the system of example 5, wherein the base station is further configured to select the network path and the second network path by: inputting the plurality of network paths, the second plurality of network paths, the power consumption associated with each network path of the plurality of network paths, and the second power consumption associated with each network path of the second plurality of network paths into a machine-learning model trained to select network paths for user equipment-to-service application connections; and receiving an output of the machine-learning model indicating the network path and the second network path.

Example 7 is the system of example(s) 1-6, wherein the wireless network comprises a fourth-generation long-term evolution network, a fifth-generation network, or a WiFi-6 network.

Example 8 is a method comprising: receiving, by a base station of a wireless network, a routing request from user equipment; determining, by the base station, a plurality of network paths of the wireless network, each network path of the plurality of network paths comprising a route between the user equipment and a service application associated with the routing request; determining, by the base station, a power consumption associated with each network path of the plurality of network paths; selecting, by the base station, a network path of the plurality of network paths based on the power consumption associated with each network path; and enabling the network path between the user equipment and the service application for the routing request.

Example 9 is the method of example 8, further comprising: prior to selecting the network path, generating a ranking of the plurality of network paths based on the power consumption for each network path; determining that the network path is associated with a lowest power consumption; and selecting the network path in response to determining that the network path is associated with the lowest power consumption.

Example 10 is the method of example(s) 8-9, further comprising: prior to selecting the network path, identifying a constraint of the service application; determining a subset of network paths of the plurality of network paths that satisfy the constraint; and selecting the network path from the subset of network paths associated with a lowest power consumption.

Example 11 is the method of example 10, wherein the constraint comprises a latency constraint, a bandwidth constraint, a packet loss constraint, or a regulatory constraint.

Example 12 is the method of example(s) 8-11, further comprising: receiving a second routing request from second user equipment; determining a second plurality of network paths of the wireless network, each network path of the second plurality of network paths comprising a second route between the second user equipment and a second service application associated with the second routing request; determining a second power consumption associated with each network path of the second plurality of network paths; and selecting the network path of the plurality of network paths and a second network path of the second plurality of network paths for the power consumption associated with the network path and the second power consumption associated with the second network path, wherein the network path and the second network path distribute power consumption across the wireless network.

Example 13 is the method of example 12, wherein selecting the network path and the second network path comprises: inputting the plurality of network paths, the second plurality of network paths, the power consumption associated with each network path of the plurality of network paths, and the second power consumption associated with each network path of the second plurality of network paths into a machine-learning model trained to select network paths for user equipment-to-service application connections; and receiving an output of the machine-learning model indicating the network path and the second network path.

Example 14 is the method of example(s) 8-13, wherein the wireless network comprises a fourth-generation long-term evolution network, a fifth-generation network, or a WiFi-6 network.

Example 15 is a non-transitory computer-readable medium comprising program code executable by a processing device for causing the processing device to: receive, by a base station of a wireless network, a routing request from user equipment;

determine, by the base station, a plurality of network paths of the wireless network, each network path of the plurality of network paths comprising a route between the user equipment and a service application associated with the routing request; determine, by the base station, a power consumption associated with each network path of the plurality of network paths; select, by the base station, a network path of the plurality of network paths based on the power consumption associated with each network path; and enable the network path between the user equipment and the service application for the routing request.

Example 16 is the non-transitory computer-readable medium of example 15, further comprising program code executable by the processing device for causing the processing device to: prior to selecting the network path, generate a ranking of the plurality of network paths based on the power consumption for each network path; determine that the network path is associated with a lowest power consumption; and select the network path in response to determining that the network path is associated with the lowest power consumption.

Example 17 is the non-transitory computer-readable medium of example(s) 15-16, further comprising program code executable by the processing device for causing the processing device to: prior to selecting the network path, identify a constraint of the service application; determine a subset of network paths of the plurality of network paths that satisfy the constraint; and select the network path from the subset of network paths associated with a lowest power consumption.

Example 18 is the non-transitory computer-readable medium of example 17, wherein the constraint comprises a latency constraint, a bandwidth constraint, a packet loss constraint, or a regulatory constraint.

Example 19 is the non-transitory computer-readable medium of example(s) 15-18, further comprising program code executable by the processing device for causing the processing device to: receive a second routing request from second user equipment;

determine a second plurality of network paths of the wireless network, each network path of the second plurality of network paths comprising a second route between the second user equipment and a second service application associated with the second routing request; determine a second power consumption associated with each network path of the second plurality of network paths; and select the network path of the plurality of network paths and a second network path of the second plurality of network paths for the power consumption associated with the network path and the second power consumption associated with the second network path, wherein the network path and the second network path distribute power consumption across the wireless network.

Example 20 is the non-transitory computer-readable medium of example 19, further comprising program code executable by the processing device for causing the processing device to select the network path and the second network path by: inputting the plurality of network paths, the second plurality of network paths, the power consumption associated with each network path of the plurality of network paths, and the second power consumption associated with each network path of the second plurality of network paths into a machine-learning model trained to select network paths for user equipment-to-service application connections; and receiving an output of the machine-learning model indicating the network path and the second network path.

Example 21 is a method comprising: receiving, by a base station of a wireless network, a plurality of routing requests from a plurality of user equipment; determining, by the base station, a plurality of network paths of the wireless network for each routing request of the plurality of routing requests, each network path of the plurality of network paths comprising a route between a user equipment of the plurality of user equipment and a service application associated with the routing request for the user equipment; determining, by the base station, a power consumption associated with each network path of the plurality of network paths for each routing request of the plurality of routing requests; selecting, by the base station, a network path of the plurality of network paths for each routing request of the plurality of routing requests based on the power consumption associated with each network path; and enabling the network path for each routing request of the plurality of routing requests.

Example 22 is the method of example 21, wherein selecting the network path for each routing request of the plurality of routing requests comprises: inputting the plurality of network paths for each routing request of the plurality of routing requests and the power consumption associated with each network path of the plurality of network paths into a machine-learning model trained to select network paths for user equipment-to-service application connections; and receiving an output of the machine-learning model indicating the network path for each routing request of the plurality of routing requests.

Example 23 is the method of example(s) 21-22, further comprising: prior to selecting the network path, identifying a constraint of the service application; determining a subset of network paths of the plurality of network paths that satisfy the constraint; and selecting the network path from the subset of network paths.

Example 24 is the method of example 23, wherein the constraint comprises a latency constraint, a bandwidth constraint, a packet loss constraint, or a regulatory constraint.

Example 25 is the method of example(s) 21-24, wherein the wireless network comprises a fourth-generation long-term evolution network, a fifth-generation network, or a WiFi-6 network.

Example 26 is a system comprising: a processing device; and a memory device including instructions that are executable by the processing device for causing the processing device to: receive, by a base station of a wireless network, a plurality of routing requests from a plurality of user equipment; determine, by the base station, a plurality of network paths of the wireless network for each routing request of the plurality of routing requests, each network path of the plurality of network paths comprising a route between a user equipment of the plurality of user equipment and a service application associated with the routing request for the user equipment; determine, by the base station, a power consumption associated with each network path of the plurality of network paths for each routing request of the plurality of routing requests; select, by the base station, a network path of the plurality of network paths for each routing request of the plurality of routing requests based on the power consumption associated with each network path; and enable the network path for each routing request of the plurality of routing requests.

Example 27 is the system of example 26, wherein the memory device further includes instructions executable by the processing device for causing the processing device to select the network path for each routing request of the plurality of routing requests by: inputting the plurality of network paths for each routing request of the plurality of routing requests and the power consumption associated with each network path of the plurality of network paths into a machine-learning model trained to select network paths for user equipment-to-service application connections; and receiving an output of the machine-learning model indicating the network path for each routing request of the plurality of routing requests.

Example 28 is the system of example(s) 26-27, wherein the memory device further includes instructions executable by the processing device for causing the processing device to: prior to selecting the network path, identify a constraint of the service application; determine a subset of network paths of the plurality of network paths that satisfy the constraint; and select the network path from the subset of network paths.

Example 29 is the system of example 28, wherein the constraint comprises a latency constraint, a bandwidth constraint, a packet loss constraint, or a regulatory constraint.

Example 30 is the system of example(s) 26-29, wherein the wireless network comprises a fourth-generation long-term evolution network, a fifth-generation network, or a WiFi-6 network.

Example 31 is a system comprising: first means for providing a routing request for accessing a service application; and second means for selecting a network path of a wireless network for the routing request based on a power consumption of the network path and additional network paths of the wireless network, the second means configured to enable the network path in response to selecting the network path.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A system comprising:
- user equipment configured to connect with a service application via a wireless network;
- a plurality of network devices of the wireless network configured to form a plurality of network paths between the user equipment and the service application; and
- a base station of the wireless network configured to:
  - receive a routing request from the user equipment indicating a request to connect with the service application;
  - determine a power consumption associated with each network path of the plurality of network paths;
  - identify a constraint of the service application, the constraint being a latency constraint, a bandwidth constraint, a packet loss constraint, or a regulatory constraint;
  - determine a subset of network paths of the plurality of network paths that satisfy the constraint;
  - generate a ranking of the subset of network paths based on the power consumption associated with each network path in the subset;
  - select a network path of the subset of network paths based on the ranking; and
  - enable the network path between the user equipment and the service application.

2. The system of claim 1, wherein the base station is further configured to:
- determine that the network path is associated with a lowest power consumption; and
- select the network path in response to determining that the network path is associated with the lowest power consumption.

3. The system of claim 1, wherein the base station is further configured to:
- receive a second routing request from second user equipment;
- determine a second plurality of network paths of the wireless network, each network path of the second plurality of network paths comprising a route between the second user equipment and a second service application associated with the second routing request;
- determine a second power consumption associated with each network path of the second plurality of network paths; and
- select the network path of the plurality of network paths and a second network path of the second plurality of network paths for the power consumption associated with the network path and the second power consumption associated with the second network path, wherein the network path and the second network path distribute power consumption across the wireless network.

4. The system of claim 3, wherein the base station is further configured to select the network path and the second network path by:
- inputting the plurality of network paths, the second plurality of network paths, the power consumption associated with each network path of the plurality of network paths, and the second power consumption associated with each network path of the second plurality of network paths into a machine-learning model trained to select network paths for user equipment-to-service application connections; and
- receiving an output of the machine-learning model indicating the network path and the second network path.

5. The system of claim 1, wherein the wireless network comprises a fourth-generation long-term evolution network, a fifth-generation network, or a WiFi-6 network.

6. The system of claim 1, wherein the base station is further configured to:

periodically re-evaluate the power consumption associated with each network path of the plurality of network paths; and in response to detecting a change in power consumption or network conditions:

determine an updated subset of network paths that satisfy the constraint;

generating a new ranking of the updated subset; and select a new network path of the updated subset based on the new ranking.

7. A method comprising:

receiving, by a base station of a wireless network, a routing request from user equipment;

determining, by the base station, a plurality of network paths of the wireless network, each network path of the plurality of network paths comprising a route between the user equipment and a service application associated with the routing request;

determining, by the base station, a power consumption associated with each network path of the plurality of network paths;

identifying, by the base station, a constraint of the service application, the constraint being a latency constraint, a bandwidth constraint, a packet loss constraint, or a regulatory constraint;

determining, by the base station, a subset of network paths of the plurality of network paths that satisfy the constraint;

generating, by the base station, a ranking of the subset of network paths based on the power consumption for each network path;

selecting, by the base station, a network path of the subset of network paths based on the ranking; and enabling the network path between the user equipment and the service application for the routing request.

8. The method of claim 7, further comprising:

determining that the network path is associated with a lowest power consumption; and selecting the network path in response to determining that the network path is associated with the lowest power consumption.

9. The method of claim 7, further comprising:

receiving a second routing request from second user equipment;

determining a second plurality of network paths of the wireless network, each network path of the second plurality of network paths comprising a second route between the second user equipment and a second service application associated with the second routing request;

determining a second power consumption associated with each network path of the second plurality of network paths; and selecting the network path of the plurality of network paths and a second network path of the second plurality of network paths for the power consumption associated with the network path and the second power consumption associated with the second network path, wherein the network path and the second network path distribute power consumption across the wireless network.

10. The method of claim 9, wherein selecting the network path and the second network path comprises:

inputting the plurality of network paths, the second plurality of network paths, the power consumption associated with each network path of the plurality of network paths, and the second power consumption associated with each network path of the second plurality of network paths into a machine-learning model trained to select network paths for user equipment-to-service application connections; and receiving an output of the machine-learning model indicating the network path and the second network path.

11. The method of claim 7, wherein the wireless network comprises a fourth-generation long-term evolution network, a fifth-generation network, or a WiFi-6 network.

12. A non-transitory computer-readable medium comprising program code executable by a processing device for causing the processing device to:

receive, by a base station of a wireless network, a routing request from user equipment;

determine, by the base station, a plurality of network paths of the wireless network, each network path of the plurality of network paths comprising a route between the user equipment and a service application associated with the routing request;

determine, by the base station, a power consumption associated with each network path of the plurality of network paths;

identify, by the base station, a constraint of the service application, the constraint being a latency constraint, a bandwidth constraint, a packet loss constraint, or a regulatory constraint;

determine, by the base station, a subset of network paths of the plurality of network paths that satisfy the constraint;

generate, by the base station, a ranking of the subset of network paths based on the power consumption for each network path;

select, by the base station, a network path of the subset of network paths based on the ranking; and enable the network path between the user equipment and the service application for the routing request.

13. The non-transitory computer-readable medium of claim 12, further comprising program code executable by the processing device for causing the processing device to:

determine that the network path is associated with a lowest power consumption; and select the network path in response to determining that the network path is associated with the lowest power consumption.

14. The non-transitory computer-readable medium of claim 12, further comprising program code executable by the processing device for causing the processing device to:

receive a second routing request from second user equipment;

determine a second plurality of network paths of the wireless network, each network path of the second plurality of network paths comprising a second route between the second user equipment and a second service application associated with the second routing request;

determine a second power consumption associated with each network path of the second plurality of network paths; and select the network path of the plurality of network paths and a second network path of the second plurality of network paths for the power consumption associated with the network path and the second power consumption associated with the second network path, wherein the network path and the second network path distribute power consumption across the wireless network.

15. The non-transitory computer-readable medium of claim 14, further comprising program code executable by the processing device for causing the processing device to select the network path and the second network path by:

inputting the plurality of network paths, the second plurality of network paths, the power consumption associated with each network path of the plurality of network paths, and the second power consumption associated with each network path of the second plurality of network paths into a machine-learning model trained to select network paths for user equipment-to-service application connections; and receiving an output of the machine-learning model indicating the network path and the second network path.

* * * * *